(No Model.)  4 Sheets—Sheet 1.

G. A. COLE & E. H. TAYLOR.
MACHINE FOR GROOVING INSOLES.

No. 521,583. Patented June 19, 1894.

(No Model.) 4 Sheets—Sheet 2.

G. A. COLE & E. H. TAYLOR.
MACHINE FOR GROOVING INSOLES.

No. 521,583. Patented June 19, 1894.

(No Model.) 4 Sheets—Sheet 4.

G. A. COLE & E. H. TAYLOR.
MACHINE FOR GROOVING INSOLES.

No. 521,583. Patented June 19, 1894.

Witnesses
Arthur F. Randall,
Harry W. Keyr.

Inventors
George Atwood Cole,
Eugene H. Taylor
by Macleod Calvert & Randall
their Attorneys

UNITED STATES PATENT OFFICE.

GEORGE ATWOOD COLE AND EUGENE H. TAYLOR, OF LYNN, MASSACHUSETTS; SAID TAYLOR ASSIGNOR TO SAID COLE.

MACHINE FOR GROOVING INSOLES.

SPECIFICATION forming part of Letters Patent No. 521,583, dated June 19, 1894.

Application filed January 13, 1894. Serial No. 496,779. (No model.)

*To all whom it may concern:*

Be it known that we, GEORGE ATWOOD COLE and EUGENE H. TAYLOR, citizens of the United States, residing at Lynn, in the county of Essex and State of Massachusetts, have invented certain new and useful Improvements in Machines for Grooving Insoles, of which the following is a specification, reference being had therein to the accompanying drawings.

The object of our invention is to provide a machine of simple and practical character which shall serve for conveniently and expeditiously forming parallel grooves or scores transversely across the insoles of shoes, whereby to render the said insoles flexible.

The invention consists in an improved machine for the purpose stated, containing various novel features of construction and combinations of parts, all as first will be fully described with reference to the accompanying drawings and then will be particularly pointed out and distinctly defined in the claims at the close of this specification.

Figure 1:
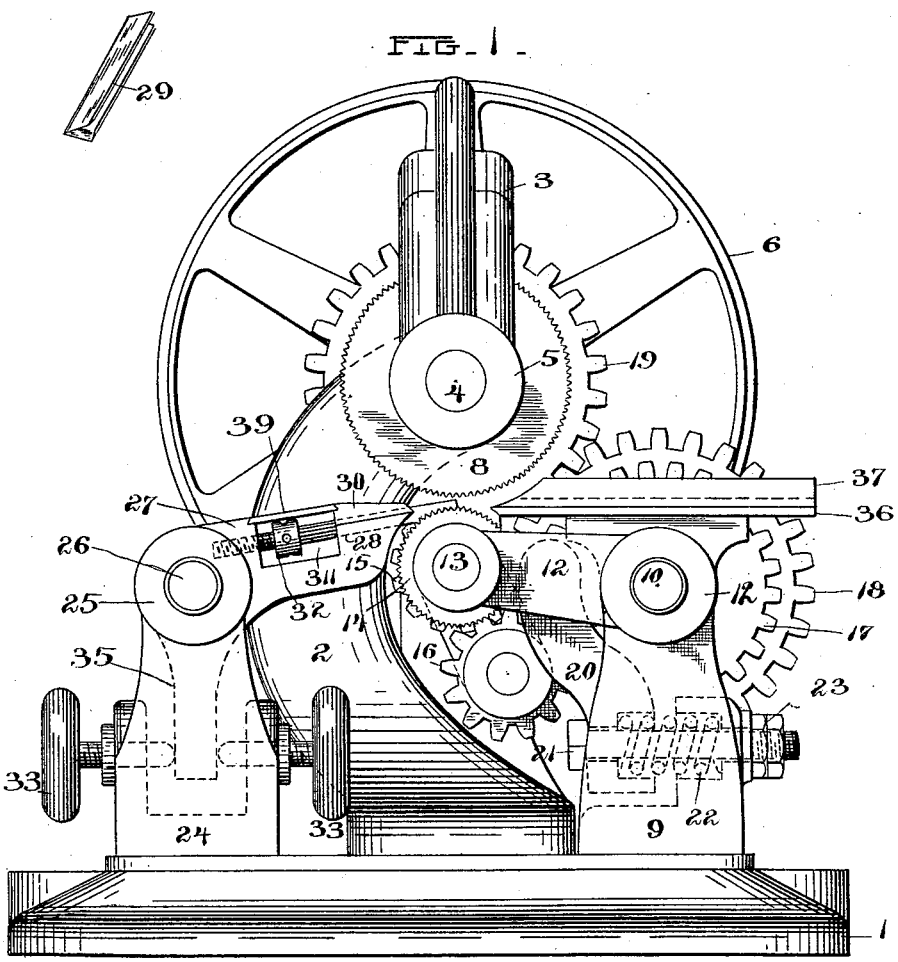
Figure 2:
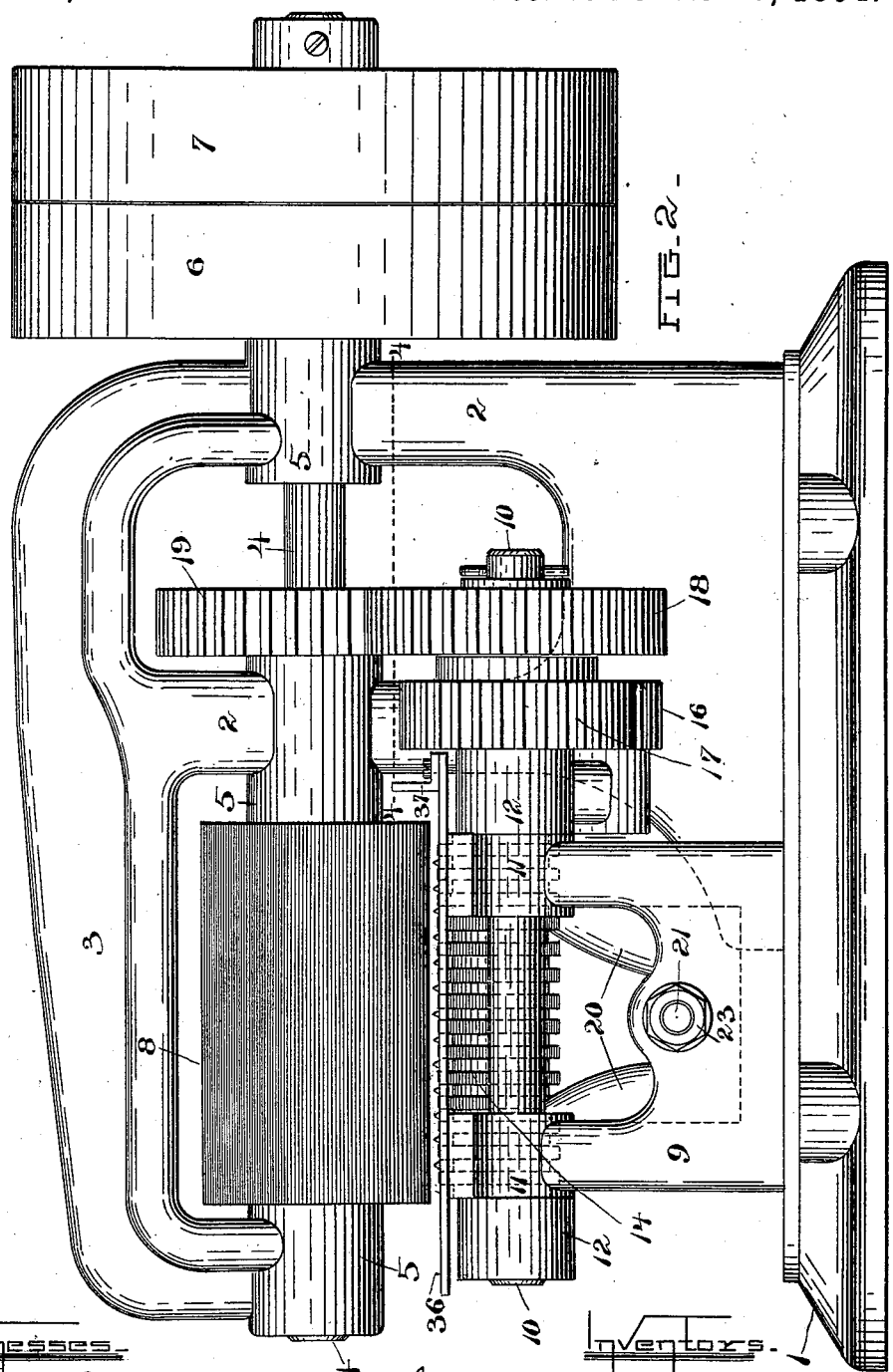
Figure 3:
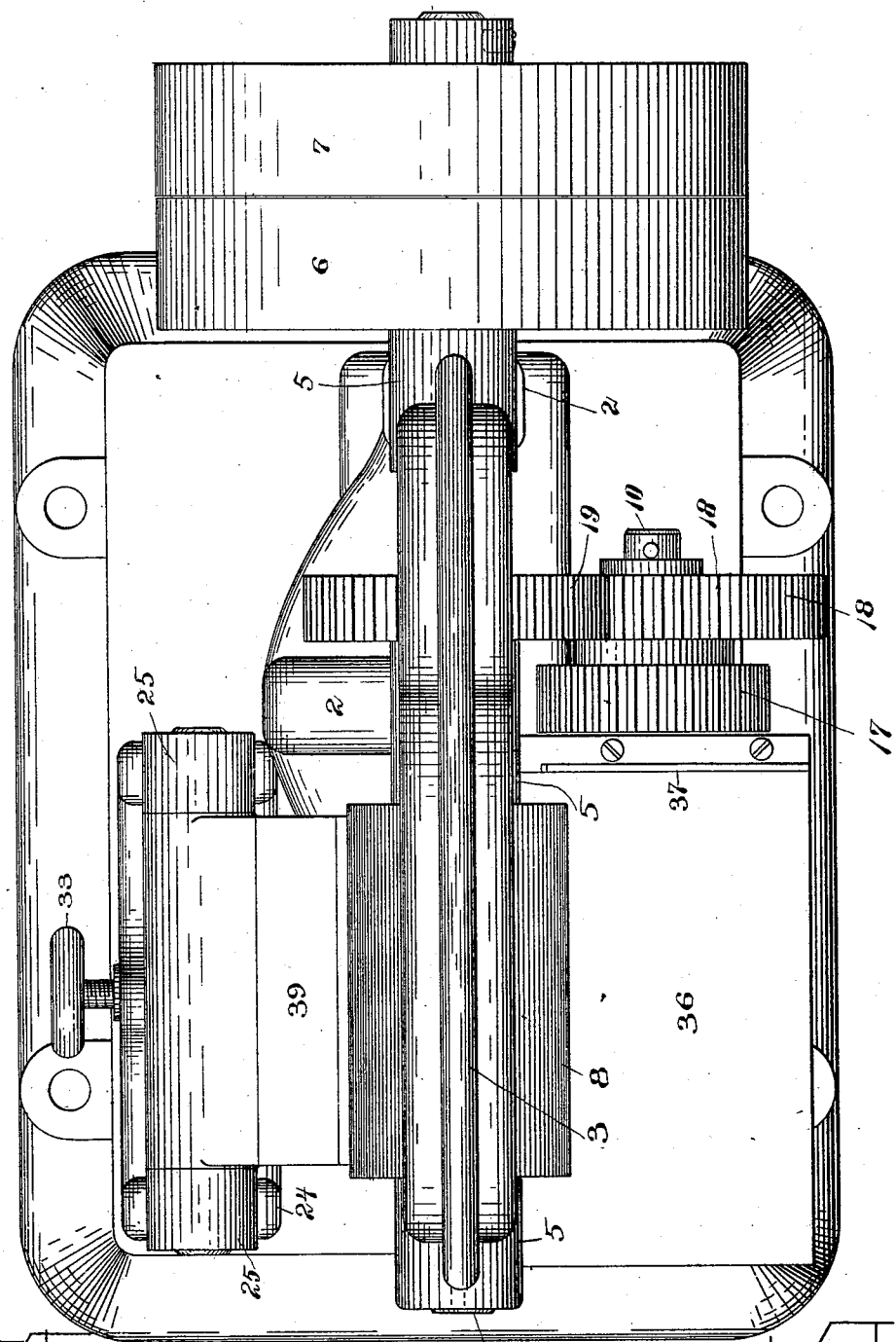
Figure 4:
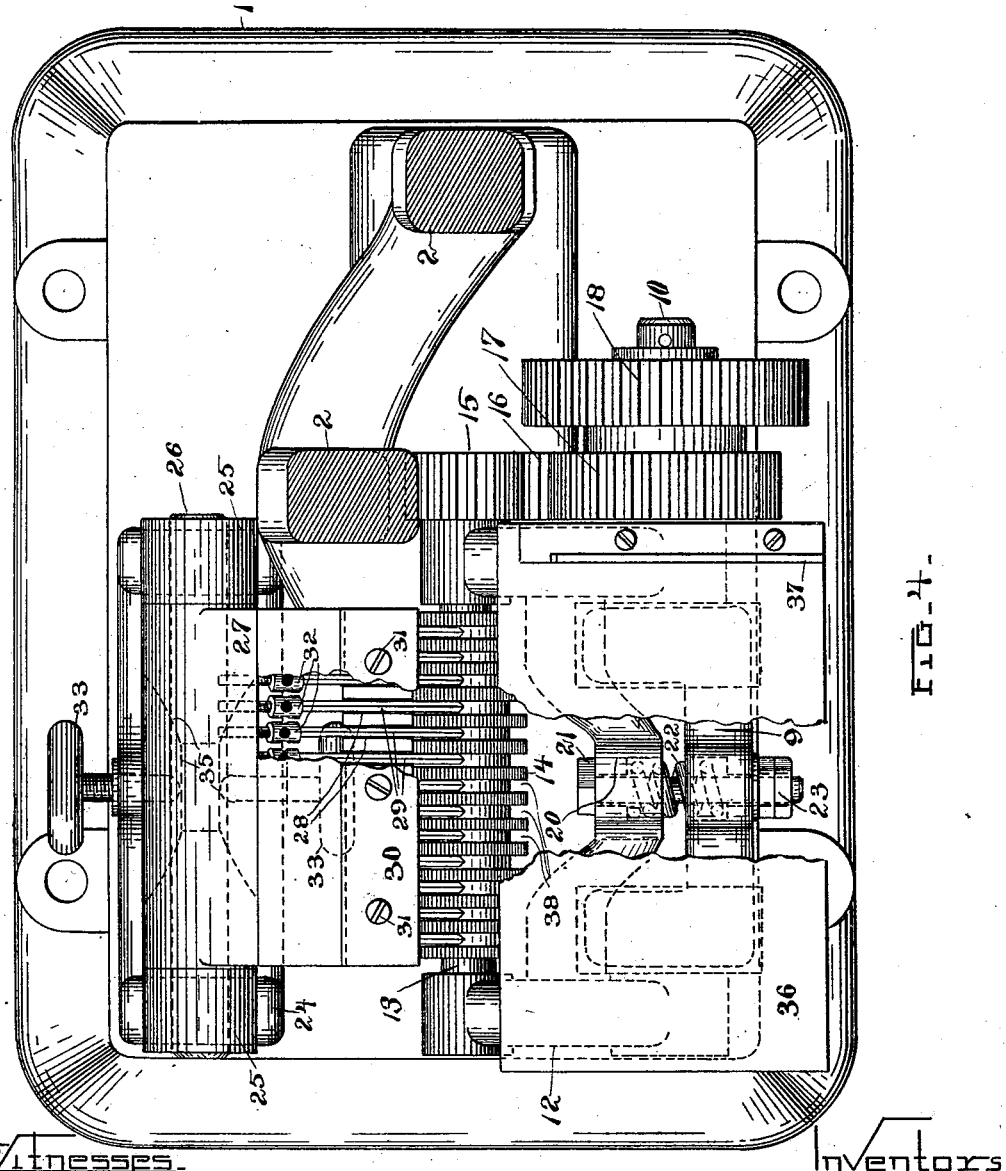

In the accompanying drawings, Figure 1 is an end view of a machine embodying our invention. Fig. 2 is a view thereof in side elevation. Fig. 3 is a view thereof in plan. Fig. 4 is a view thereof in plan with the upper feed roll, its shaft and the pulleys thereon, and the bearings for the said shaft removed, the standards containing the said bearings being in section on the line 4—4, of Fig. 2. Fig. 5 is a detail view representing one of the groove-cutters.

At 1 is the bed of the machine, at 2, 2 are standards rising therefrom, at 3 is an arm connected with the said standards and extending horizontally from the driving end of the machine to the other end thereof, at 4 is a shaft mounted in bearings 5, 5, 5, which are formed in the said standards and in the free end of the said arm, at 6 is a tight band pulley on the said shaft, at 7 is a loose band pulley on the shaft 4 at the side of the said tight pulley 6, and at 8 is the upper feed roll of the machine, the same being fast upon the said shaft 4. The said roller 8 preferably is fluted or corrugated in the direction of its length to enable it the better to engage with the stock which is passed through the machine.

At 9 is a stand rising from the bed 1 at the front of the machine, at 10 is a spindle or stud held in sleeves 11 in the upper part of the said stand, and at 12 is a swinging frame having arms formed with bearings therein to fit upon the said spindle or stud, the said arms being mounted upon the latter at opposite sides of the stand 9. The outer or free portion of the frame 12 is provided with bearings for the journals or shaft 13 of the lower feed roll 14, which latter also preferably is corrugated or fluted in the direction of the length of the same to enable it to engage with the stock. One journal of the said lower feed roll 14 has fixed thereon the pinion 15, the latter being in mesh with the second pinion 16, which is journaled to a stud carried by the frame 12. This pinion 16 also meshes with a gear 17 fast with the gear 18, the two gears 17 and 18 turning loosely on the spindle or stud 10, and the gear 18 meshes with the driving gear 19 fast on the shaft 4. Thereby the lower feed roll 14 is operated from the shaft 4. The frame 12 is free to swing to a slight extent in a substantially vertical arc, but the gearing described serves for the actuation of the lower feed roll whatever may be the position or movement of the frame 12. A downwardly projecting portion or arm 20 of the frame 12 is perforated for the passage therethrough of a bolt 21, the head whereof is at the inner side of the said portion or arm while the stem thereof passes through a hole in the latter and also through a hole in the stand 9, the said stem receiving thereon between the said arm and the said stand a spiral spring 22. The arm and stand are recessed as indicated in dotted lines in Fig. 1 to form sockets or seats for the reception of the ends of the said spiral spring 22. To the threaded end of the bolt at the front side of the stand 9 are applied nuts 23 by means of which the position of the head of the bolt may be adjusted. The spring acts upon the swinging frame in a manner to press the lower feed roll 14 upward toward the upper feed roll 8, and the bolt 21 serves as an adjustable stop by means of which to limit the closeness of the approach of the said lower feed roll to the upper feed roll. By suitably turning the nuts 23 the bolt 21 may be adjusted to vary the space between the feed rolls as may be required.

At 24 is a stand applied to the bed 1 at the rear of the feed rolls. In the upper part of this stand are provided bearings 25 for the journals 26 of the swinging frame 27. The free end of this frame projects forwardly into close proximity to the feed rolls and partly enters the tapering space between them. In the said free end there are formed a series of parallel grooves 28 in which are placed the grooving tools or cutters 29. Each of the latter is substantially V-shaped in cross section as indicated in Fig. 5, and is placed in the groove provided therefor in the frame 27 with the apex of the V uppermost. To hold the grooving devices or cutters in place in the grooves 28, a cover plate 30 is applied as shown in Figs. 1 and 4, and secured in place over the grooves 28 and cutters 29 by means of screws 31 passing through the said plate 30 and entering the frame 27. At the inner ends of the grooves 28 a channel 311 is formed across the swinging frame 27 to provide a space for the reception of the heads of the adjusting screws 32. One of these screws is placed in line with each of the cutters 29 as indicated in Figs. 1 and 4, the threaded stem of the screw being fitted to a threaded hole in the rear part of the frame 27, the inner end of the cutter resting against the top of the head of the screw, and the screw being turned backwardly or forwardly as may be required in securing the proper position of the working end of the cutter. It is found in practice that good results are secured by having the working ends of the cutters located at or approximately at the line on which the two feed rolls approach each other most closely, and the screws 32 provide for enabling the cutters to be adjusted in this line and also for separate adjustment of the respective cutters in order to enable the working ends of the cutters to be brought to one and the same line notwithstanding the difference in length either originally existing or occasioned by the sharpening of the cutters.

For the purpose of varying the depth of the grooves which are formed in the insole, the inner end of the frame 27 is raised or lowered by means of set-screws 33 passing through the opposite sides of the stand 24 and bearing against opposite sides of the depending arm 35 of the frame 27.

At 36 is a table at the front of the machine, and at 37 is a flange or guide at one end of the said table. The lower feed roll 14 has a number of annular grooves 38 formed around the same for the reception of the working ends of the cutters 29, there being one of these grooves for each cutter. These grooves enable the working ends of the cutters to enter between the feed roll up to the lines of closest approach of the latter, and at the same time permit the fluted or corrugated surfaces of the said rolls to approach as closely to each other as may be desired.

A piece of stock to be used as an insole in the manufacture of a shoe is placed on the table 36 with one end thereof resting against the flange or guide 37, and is then pressed forward by hand until its advancing edge passes into the bite of the feed rolls. It is then engaged and carried forward by the said feed rolls, the lower of which yields to permit the stock to enter between them and also yields to adapt itself to any inequalities in the stock. By the action of the rolls the stock is fed forward against the ends of the groove cutters, it passing over the latter, and the angular portions or apices of the said groove cutters act to score or groove the under side of the stock. The number of cutters which may be employed at a time may be varied as desired. On removing the plate or cover 30 the cutters may be taken from the grooves 28 at the points where it is not desired that the stock should be scored or grooved, or cutters may be introduced into such grooves as necessary. The heads of the screws 32 are covered by a slide plate 39, the edges of which fit undercut grooves in the body of the frame 27 and the rear edge of the cover-plate 30 respectively. The upper surfaces of the cover plate 30, the slide plate 39, and the rear portion of the frame 27, form a smooth unbroken bed over which the stock may slide as it leaves the feed rolls. The strips or cords cut from the stock by the cutters pass downward between the forward end of the frame 27 and the roll 14.

We claim as our invention—

1. The improved machine for forming parallel grooves in the surfaces of insoles to render the latter flexible, having a pair of feed-rolls one of which is formed with annular grooves, a series of groove-cutters, formed as V-shaped strips a swinging support or holder on which said groove-cutters are mounted with their working ends between the feed-rolls and with the side edges of the V in the grooves aforesaid, at one side of the line of travel of the stock as it is fed forward by the said feed-rolls, and set screws for adjusting said support or holder to raise or depress the said working ends in the annular grooves aforesaid and vary the depth of the grooves made by the angles of the groove-cutters, substantially as described.

2. The improved machine for forming parallel grooves in the surfaces of insoles to render the latter flexible, having a pair of feed-rolls, bearings for the shaft of one of said feed-rolls, a gear on said shaft, a gear 17, operative connections intermediate said gears, a frame supporting the other of said feed rolls, and movable concentrically about the axis of said gear 17, gearing for rotating the feed-roll on said frame from the gear 17, a spring acting upon said frame to press its feed-roll toward the other, a stop to limit the movement of the frame under the action of the spring, a series of groove cutters, and a support or holder on which said groove-cutters are mounted with their working ends between the feed-rolls and at one side of the line of travel of the stock as it is fed forward by the said feed-rolls, substantially as described.

3. The improved machine for forming parallel grooves in the surface of insoles to render the latter flexible, having the feed-rolls 8 and 14, the latter formed with annular grooves 38, the swinging frame 12 on which the feed-roll 14 is mounted, the spring 22 acting on said frame, the adjustable stop 21 engaging with said frame, gearing for driving feed roll 14 from the shaft of feed-roll 8, the series of groove cutters, the swinging frame on holder 27 in which said cutters are mounted with their working ends between the feed-rolls and in the annular grooves aforesaid, at one side of the line of travel of the stock as it is fed forward by the said feed-rolls, and the set screws 33, 33, for adjusting said frame or holder 27 to raise or depress the working ends of the groove-cutters in the said annular grooves, substantially as described.

4. The improved machine for forming parallel grooves in the surface of insoles to render the latter flexible, having a pair of feed rolls, a series of groove cutters, a removable support or holder in which said groove cutters are mounted with their working ends between the feed rolls and at one side of the line of travel of the stock as it is fed forward by the said feed-rolls, the said support or holder having a series of grooves for the reception of the groove cutters and a removable cover plate for holding said groove-cutters in the said grooves, and means for adjusting the said support or holder to shift the free ends of the said groove-cutters into the desired position between the rolls, substantially as described.

5. The improved machine for forming parallel grooves in the surfaces of insoles to render the latter flexible, having a pair of feed-rolls, a series of independent groove cutters, and a support or holder in which said groove-cutters are mounted with their working ends between the feed rolls and at one side of the line of travel of the stock as it is fed forward by the said feed-rolls, and a series of screws on the said support or holder for separately adjusting the individual groove-cutters endwise, substantially as described.

In testimony whereof we affix our signatures in presence of two witnesses.

GEORGE ATWOOD COLE.
EUGENE H. TAYLOR.

Witnesses:
CHAS. F. RANDALL,
WM. A. MACLEOD.